US006907457B2

(12) United States Patent
Merrell et al.

(10) Patent No.: US 6,907,457 B2
(45) Date of Patent: Jun. 14, 2005

(54) ARCHITECTURE FOR ACCESS TO EMBEDDED FILES USING A SAN INTERMEDIATE DEVICE

(75) Inventors: Alan Ray Merrell, Fremont, CA (US); Stephen Gouze Luning, Austin, TX (US)

(73) Assignee: Dell Inc., Rockville, MD (US)

( * ) Notice: Subject to any disclaimer, the term of this patent is extended or adjusted under 35 U.S.C. 154(b) by 838 days.

(21) Appl. No.: 09/770,104

(22) Filed: Jan. 25, 2001

(65) Prior Publication Data

US 2002/0099797 A1 Jul. 25, 2002

(51) Int. Cl.[7] .......................................... G06F 15/173
(52) U.S. Cl. ...................... 709/223; 709/217; 709/224; 711/113; 711/162; 707/200
(58) Field of Search ................................. 709/203, 217, 709/219, 223–224; 707/1, 8–10, 200–201, 9; 711/113, 162

(56) References Cited

U.S. PATENT DOCUMENTS

| | | | |
|---|---|---|---|
| 5,218,695 A | | 6/1993 | Noveck et al. |
| 5,271,007 A | * | 12/1993 | Kurahashi et al. .......... 370/351 |
| 5,345,586 A | | 9/1994 | Hamala et al. |
| 5,412,791 A | | 5/1995 | Martin et al. |
| 5,481,707 A | | 1/1996 | Murphy et al. |
| 5,504,873 A | | 4/1996 | Martin et al. |
| 5,546,535 A | | 8/1996 | Stallmo et al. |
| 5,634,111 A | | 5/1997 | Oeda et al. |
| 5,778,349 A | | 7/1998 | Okonogi |
| 5,802,366 A | | 9/1998 | Row et al. |
| 5,903,913 A | | 5/1999 | Ofer et al. |
| 5,926,833 A | | 7/1999 | Rasoulian et al. |
| 5,931,918 A | | 8/1999 | Row et al. |
| 5,944,789 A | | 8/1999 | Tzelnic et al. |
| 5,953,716 A | | 9/1999 | Madnick et al. |
| 6,029,237 A | | 2/2000 | Beelitz ....................... 711/173 |
| 6,044,367 A | | 3/2000 | Wolff |
| 6,047,294 A | | 4/2000 | Deshayes et al. |
| 6,067,545 A | | 5/2000 | Wolff |
| 6,073,209 A | | 6/2000 | Bergsten |
| 6,101,508 A | | 8/2000 | Wolff |
| 6,148,414 A | * | 11/2000 | Brown et al. ................... 714/9 |
| 6,493,804 B1 | * | 12/2002 | Soltis et al. ................. 711/152 |
| 6,535,518 B1 | * | 3/2003 | Hu et al. ...................... 370/401 |
| 6,538,669 B1 | * | 3/2003 | Lagueux et al. ............. 715/764 |
| 6,640,278 B1 | * | 10/2003 | Nolan et al. .................... 711/6 |

OTHER PUBLICATIONS

Steve Best et al. "*JFS Layout: How the Journaled File System Handles the On–Disk Layout*" May 25, 2000, http://www–4.ibm.com/software/developer/library/jfslayout/ Total of 32 pages.

"*Linux Cross Reference* ext2/lib/ext2fs/bmap.c", Aug. 31, 2000 http://miller.cs.wm.edu/lxr3.ext2/http/source/lib/ext2fs/bmap.c Total of 5 pages.

* cited by examiner

*Primary Examiner*—Ario Etienne
*Assistant Examiner*—LaShonda Jacobs
(74) *Attorney, Agent, or Firm*—Baker Botts L.L.P.

(57) ABSTRACT

An intermediate system, such as a switch or storage domain manager, in a storage area network includes a plurality of clients, a file server which manages access to storage according to a file system architecture using file system parameters, and one or more storage systems. Processing resources are included in the intermediate system, which manage communication according to a storage area network protocol, such as SCSI and variations like FCP, which identifies units of storage according to storage area network parameters. The processing resources farther include logic to identify a particular message received from one of the plurality of clients under the storage area network protocol as a message relating to the file system architecture, to parse the particular message for file system parameters of an access according to the file system architecture, and to translate the file system parameters to an access using storage area network parameters. The access is then carried out in the storage area network between the client and the storage, using the such storage area network parameters. The translation of file system parameters to storage area network parameters is confined to the intermediate system, in one preferred embodiment enhancing security and efficiency of the file system transactions.

30 Claims, 3 Drawing Sheets

ARCHITECTURE FOR ACCESS TO EMBEDDED FILES USING A SAN INTERMEDIATE DEVICE

BACKGROUND OF THE INVENTION

1. Field of the Invention

This invention relates to the field of mass storage systems. In particular, the invention relates to the management of access to shared files managed by file systems in intelligent storage area networks.

2. Description of the Related Art

The storage of large amounts of data in so-called mass storage systems is becoming a common practice. Mass storage systems typically include storage devices coupled to file servers on data networks. Users in the network communicate with the file servers for access to the data. The file servers are typically connected to specific storage devices via data channels. The data channels are usually implemented with point-to-point communication protocols designed for managing storage transactions.

As the amount of storage increases, and the number of file servers in communication networks grows, the concept of a storage area network (SAN) has arisen. Storage area networks connect a number of mass storage systems in a communication network which is optimized for storage transactions. For example, fibre channel arbitrated loop (FC-AL) networks are being implemented as SANs. The SANs support many point-to-point communication sessions between users of the storage systems and the physical storage on the SAN.

File servers are used to manage shared access to data in storage, and typically use a logical storage architecture, by which users of the files are able to share the data. For example, file servers enforce exclusive access by a single user for certain types of operations, and allow multiple users to use a file for other types of operations. In a large network, a plurality of clients (i.e. computers that use storage) and one or more file servers (i.e. computers that manage files for clients, and usually use storage as well) are coupled to a storage area network fabric, or switch, which supports physical storage access protocol, like the Small Computer System Interface SCSI and variations of it like the Fibre Channel Protocol FCP, which is the SCSI serial command protocol used on Fibre Channel networks. The clients may also be coupled to a file server by a communication network, such as an Internet Protocol IP network, by which file access is controlled. File servers include a so-called logical to physical block mapping program, such as BMAP, by which logical files, expressed in the logical format of the file system, usually in a File Access Block FAB format in which INODES specify files, are mapped to physical storage extents, such as disk volumes. (See, for example, the Linux utility "bmap.c") The file access requests using the logical storage architecture, such as INODES, are mapped by the file server to files specified by parameters, according to the SAN physical storage architecture. Using the physical storage architecture parameters, the requests are carried out by the file server with appropriate protections. However, in some cases, file access using the physical storage architecture may be made by clients of the file server directly. For example, in the case that the file server grants exclusive access to a file to a particular client, the file server BMAP function is used to provide the physical storage architecture parameters of the file to the particular client. The client then accesses the file through the SAN switch directly, rather than through the file server.

While access using the physical storage architecture is more efficient, in terms of access time, consumption of file server resources, and network utilization, it comes at the cost of potential loss of control by the file server over access to the files. Once a client obtains the physical storage architecture parameters associated with a set of data, it can bypass the file server, and use the SAN for direct access by which it may corrupt the file, or interfere with other authorized accesses to the file. This security hole is not necessarily limited to the file for which the parameters were obtained. If the client has an error or intentionally does not follow the rules, it could access and/or corrupt any file in the system.

Current implementations known to the inventors either ignore this security flaw, or rely on software in the clients to cooperate in not making invalid accesses to the data. This cooperative approach works in friendly, controlled environments, where there are no flawed programs. However, whenever clients of a file server have direct access to the SAN on which the files being managed are found, the security risk remains.

Overall, as the complexity and size of storage systems and networks increase, the problems of managing configuration of the users of the data and of the storage systems themselves multiply. Accordingly, there is a need for systems that simplify management of storage systems, while taking advantage of the flexibility and power of the SAN architecture. In general, it is also desirable to maintain network flexibility and efficiency, while minimizing security risks.

SUMMARY OF THE INVENTION

The present invention provides an intermediate system, such as a switch or storage domain manager, in a storage area network that includes a plurality of clients, a file server which manages access to storage according to a file system architecture using file system parameters, and one or more storage systems. The intermediate system comprises a plurality of communication interfaces, adapted for connection via communication media with respective clients in the plurality of clients and with the one or more storage systems. Processing resources are included in the intermediate system, which are coupled to the plurality of communication interfaces. The processing resources manage communication via said plurality of communication interfaces according to a storage area network protocol, such as SCSI and variations of it like FCP, which identifies units of storage according to storage area network parameters. The processing resources further include logic to identify a particular message received from one of the plurality of clients under the storage area network protocol as a message relating to the file system architecture, to parse the particular message for file system parameters of an access according to the file system architecture, and to translate the file system parameters to an access using storage area network parameters. The translation of file system parameters to storage area network parameters is confined to the intermediate system, in one preferred embodiment enhancing security and efficiency of the file system transactions. The access is then carried out in the storage area network between the client and the storage directly, using the such storage area network parameters. The clients of the file system need not be given the physical addressing parameters used by the storage area network, of files in the file system. In this way, the logical file management processes of the file system cannot be bypassed by its clients. At the same time, the efficiencies of allowing data flow between the storage in the clients directly, when appropriate permissions are granted by the file system, are achieved.

In one embodiment, the file system resides in a server that is coupled to the intermediate system via one of the plurality of communication interfaces. In another embodiment, the file system is installed within the intermediate system itself.

In one embodiment, the particular message comprises a command according to the storage area network protocol that is directed to a "phantom" volume. For example, the message may be directed to a physical block of storage which is outside an actual range of physical blocks accessible in the storage area network. In one embodiment, the particular message comprises a command compliant with a standard SCSI write command, which carries at least a portion of the file system access parameters in a buffer associated with the command. The intermediate system recognizes a write command directed to the file system virtual volume, as a file system command, and processes it accordingly.

In various embodiments of the invention, the processing resources in the intermediate system further include logic for logical bounds checking and/or for access control in cooperation with the file system.

In one embodiment, communications with the file system to support the translation process, and the logical bounds and access control processes, when the file system is located remotely from the intermediate system, are also executed using commands according to the storage area network protocol directed to a file system virtual volume. The file system virtual volume for file system commands may be the same file system virtual volume used by clients, or a separate file system virtual volume as suits the needs of a particular implementation.

The present invention also is embodied by a method for management of access to storage resources by a plurality of clients in a storage area network. The method comprises:

providing a file system server in the storage area network in communication with the plurality of clients for file access management in order to manage access to storage according to a file system architecture;

installing an intermediate system in the storage area network between the plurality of clients and storage resources in the storage area network;

identifying a particular message received in the intermediate system from one of the plurality of clients under the storage area network protocol as a message relating to the file system;

parsing the particular message in the intermediate system for file system parameters of access according to the file system architecture;

translated file system parameters to access using storage area network parameters; and routing said access using the storage area network parameters through the intermediate device.

The present invention is also embodied by a process by which a read or write command, such a block read or block write operation, is produced according to a file system architecture in a client or in the file system server. The file system command is embedded in a message directed to a file system virtual volume according to a storage area network protocol such as FCP. The storage area network protocol message is sent on the storage area network fabric, where it is picked up by an intermediate device. The storage area network protocol message is parsed in the intermediate device to restore the parameters of the file system command. The intermediate device maps the file system parameters to physical parameters of storage area network. Optionally, the intermediate device also performs logical bounds checking and access control checking in cooperation with the file system. A command is issued according to the storage area network protocol using the physical parameters, to satisfy the file system command.

Thus, a file system model in which the disk drives, or other storage systems, that hold the file data can be read from and written to by the file system clients directly, as well as by the file system server is supported by the present invention. According to the present invention, instead of a client making a logical request to the file server (such as read file "a," offset 10 for 100 bytes), the client can now make a request directly to the SAN fabric to try to read that data. The SAN fabric includes resources to translate the logical request into the proper physical address of the data on the disk (using for example the BMAP function).

Other aspects and advantages of the present invention can be seen upon review of the figures, the detailed description, and the claims which follow.

DETAILED DESCRIPTION

Figure 1:
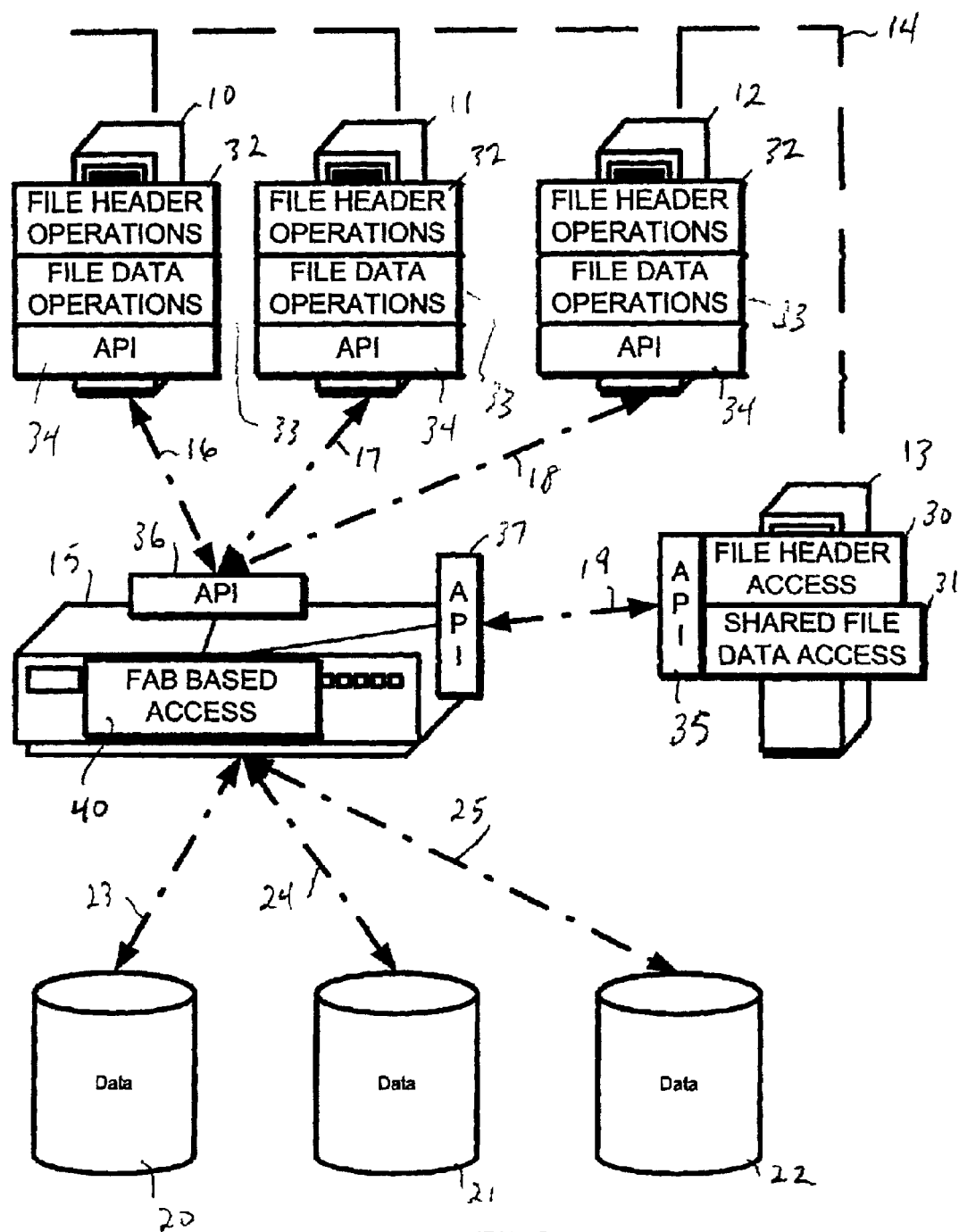
FIG. 1 provides a network block diagram of a system including a file system server, a plurality of clients, and an intermediate device in a storage area network according to the present invention.

A detailed description of preferred embodiments of the present invention is provided below, with reference to FIGS. 1–3. FIG. 1 illustrates a network scenario in which the present invention is implemented. The network includes a plurality of clients 10, 11, 12 and a file system server 13. The plurality of clients 10, 11, 12 and the file system server 13 are interconnected by a communication network 14, such as the Internet, other wide area networks, a local area network supporting an internal Internet protocol, or others. The plurality of clients 10, 11, 12 and the file system server 13 are coupled to a storage area network fabric including intermediate device 15, by respective storage area network links 16, 17, 18, 19. Storage resources 20, 21, 22 are also coupled to the storage area network fabric via the intermediate device 15, by respective storage area network links 23, 24, 25.

The file system server 13 operates a file system having a file system architecture. It includes in a typical case, file header access logic 30 and shared file data access logic 31. The clients 10, 11, 12 are provided access to files managed by the file system server 13 via the control logic 30, 31. Each client 10, 111, 12 includes file header operations 32 by which rights for access to files are obtained from the file header access logic 30 of the file system server 13. According to the present invention, the clients 10, 11, 12 also include file data operations 33, by which access to data in the storage systems 20, 21, 22 is gained.

File system application interfaces 34 are included in each of the clients 10, 11, 12. Also, an application interface 35 is included in the file system server 13. The application interfaces 34 and 35 are interconnected with corresponding application interfaces 36 and 37 respectively on the intermediate device 15. The application interfaces 36 and 37 provide channels into file access block FAB based access logic 40 within the intermediate device. The FAB based access logic 40 manages communications over the storage area network protocol with the storage systems 20, 21, 22 on behalf of the clients 10, 11, 12.

Logical to physical mapping software is stored in the FAB based access logic 40 within the intermediate device 15 for use by the file system server 13 and by the clients 10, 11, 12 of the file system. A file request, instead of being mapped to a physical storage area network address on the client 10, 11, 12, is sent as a logical request (using the file system architecture) via the application interfaces 34 to the intermediate device 15. The intermediate device validates that the requesting client is allowed to make a logical operation against the file it is requesting. If the client making the request has properly opened the file using the file system architecture, and the logical operation requested is within the physical bounds of the file, then operation is completed as requested. Validity checks are made using the logical file handle to ensure that the requesting client is allowed to use that handle, and that the requested operation is allowed in combination with that handle. Validity checks are also made to ensure that the byte range for the logical operation falls within the actual byte range of the allowed operation, and that it is within the physical bounds of the file.

The validity checks are made by communication with the file system server 13. The data supporting the validity checks may be downloaded by the file system server 13, as the permissions are granted and denied in real-time. Alternatively, the intermediate device 15 may forward messages to the file system server 13, and receive appropriate authority messages in reply. Alternatively, the intermediate device may request data from the file system server 13, with which the validity checks can be made on the immediate device 15, for each transaction. Any combination of these protocols for performing validity checks can be utilized.

Figure 2:
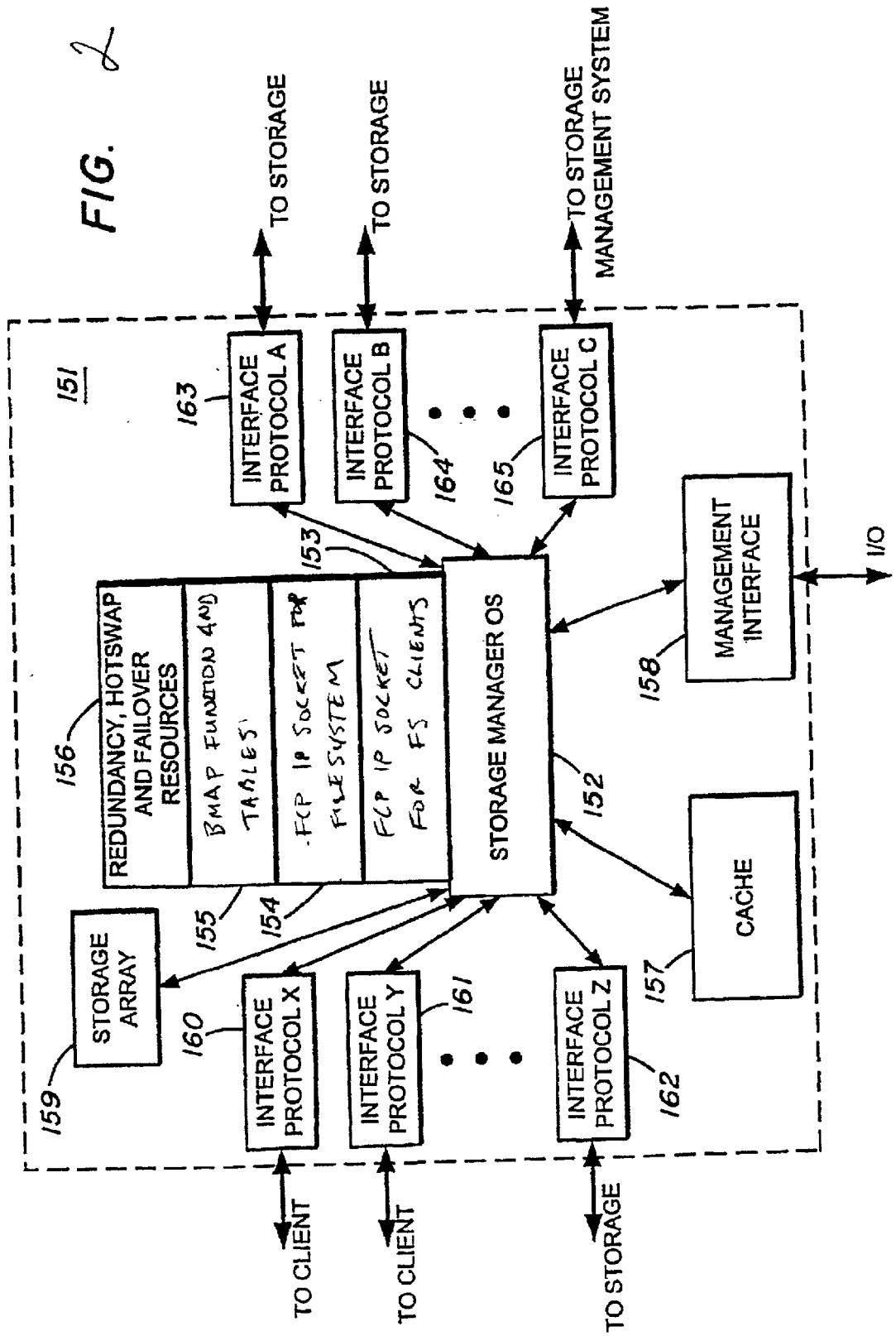
FIG. 2 is a simplified block diagram of an intermediate device according to the present invention.

FIG. 2 is a block diagram showing functional components of an intermediate system 151, like that illustrated with respect to FIG. 1, acting as a switch in the SAN fabric, or as a storage management system for use in storage domain management within the SAN fabric. The system 151 includes a storage manager operating system 152, and optionally functional components including storage domain routing resources, legacy device emulation resources, and data migration resources. For a description of functional components of an example storage domain manager, see co-pending U.S. patent application Ser. No.: 09/482,213 entitled, "Storage Domain Management System," filed Jan. 12, 2000.

According to the present invention, the intermediate system 151 includes an application interface 154, including for example a socket supporting either or both of the FCP and IP, for communications with the file system server, and an application interface 153 for communication with clients of the file system server. The application interfaces include logic for parsing incoming messages directed to a file system virtual volume, or otherwise identified as related to the file system, to identify access parameters. Also, the interfaces include logic, such as BMAP functional logic and tables 155, to map the logical parameters of the file system to physical parameters of the storage area network, and logic to issue access commands on behalf of the clients using the physical parameters. The intermediate system also includes redundancy, hot swap and failover resources 156. The storage manager operating system coordinates communication among these resources, and includes in various embodiments an on-chassis cache 157, a management interface 158, and an on-chassis storage array 159.

The cache 157 comprises a solid state non-volatile memory array in one embodiment of the invention, for safe support of storage transactions. In another embodiment, the cache 157 comprises redundant arrays, for additional fault tolerance.

A plurality of communication interfaces 160–165 are provided on the intermediate system 151. In this example, the interface 160 is adapted to execute protocol X between a client and the intermediate system 151; interface 161 is adapted to execute protocol Y between a client and the intermediate system 151; interface 162 is adapted to execute protocol Z between a storage device and the intermediate system 151; interface 163 is adapted to execute protocol A between a storage device and the intermediate system 151; interface 164 is adapted to execute protocol B between a storage device and intermediate system 151; and interface 165 is adapted to execute protocol C between the intermediate system 151 and another intermediate system on the network.

In the example illustrated, protocols X–Z and protocols A–C are supported by the intermediate system 151. These protocols may be multiple different protocols, variants of a single protocol, or all the same as suits a particular storage area network in which the system is utilized. In a preferred embodiment, protocols X–Z and A–C are a single storage area network protocol, such as FCP, which addresses data using physical layer addressing of the storage systems, such as by disk volumes.

Storage transactions traverse the interfaces 160–165 from respective communication media to the internal resources of intermediate system 151. In a preferred system, storage transactions are translated to a common messaging format internal to the system for routing among the various interfaces, independently of the protocols executed by those interfaces. Storage domain routing resources map the transactions within the storage domain using virtual circuits configured for particular client devices and storage devices. Legacy emulation resources and data migration resources allow a storage domain to be reconfigured at the intermediate system 151 as new equipment is added and removed from the network. For example, a new storage device may be added to the network, and a data set in an existing storage device may be migrated to a new storage device, and storage transactions from clients using the data set may be made to appear as if they remain on the existing storage device during the migration, and after migration is completed by providing target emulation. The redundancy, hot swap, and failover resources 156 insure fault-tolerance, and support continuous operation of the intermediate system 151 for high throughput data storage networks.

Figure 3:
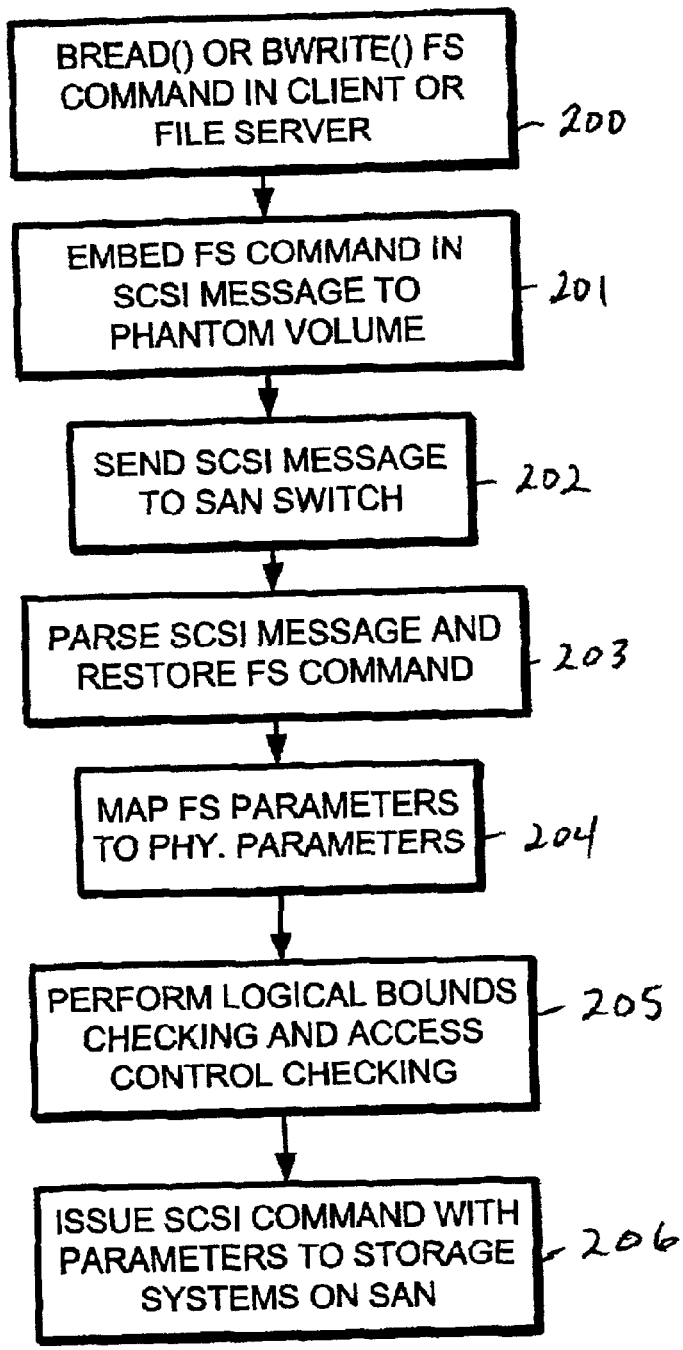
FIG. 3 is a flow chart illustrating the messaging process by which clients access storage of a file system via the intermediate device of the present invention.

FIG. 3 provides a simplified flow diagram for the process of the present invention, in which the file access block based operations are located in the intermediate device within the storage area network fabric. File system architectures include read and write commands, such as the BREAD ( ) and the BWRITE ( ) commands. Such commands express file access parameters using the logical addressing of the file system, such as using file access block based addressing in which an INODE defines the extent of a file. Such a command is produced in a client of a file system, or in the file server for the file system (step 200). According to the present invention, the file system command is embedded in a message used in the storage area network protocol, such as in a SCSI write command. In the preferred embodiment, this SCSI write command is directed to a file system virtual volume which is outside the range of volumes accessible in the storage area network (step 201). The SCSI message is transmitted on the storage area network to the intermediate device or switch (step 202). The buffer of the write command carries the parameters of the file system command, and is part in the intermediate device to restore the file system command (step 203). In the intermediate device, the file access block based file system parameters are matched to physical parameters of the storage area network (step 204). Also, logical bounds checking and access control checking are executed (step 205). Steps 204 and 205 can be performed in any order, or in parallel. Finally, a SCSI command is issued using the physical parameters to the storage systems on the storage area network, and the responses to the command are directed to the client directly (step 206).

In the intermediate device, a BMAP function and tables are used to find a physical address (e.g. Target/LUN) on a volume that corresponds to the logical address within a given file. In-order to perform this mapping function, a BMAP command is invoked with the parameters to specify the file, such as an INODE identifier. In addition, the logical offset and transfer length needed to satisfy the read or write process are provided. The INODE identifier provides an address that maps into the file system metadata. Each file is described by an INODE data structure within this metadata. The BMAP function reads the INODE data into local memory and competes the logical to physical address transformation using this information. A standard SCSI command, using the physical address which results, is issued on the storage area network to satisfy the file system request.

By providing the BMAP function in the intermediate device, the transformation work typically done by the file system server and shared among clients of the file system, is now performed in an intermediate device. This makes the data in the file system immune from attempts to improperly access physical data in a shared file system, while maintaining efficient access to storage area network data.

By putting the logical to physical mapping in a central location, the general advantages of distributed design, and the performance advantage of reading physical blocks over FCP (or other SAN protocol) instead of IP (or other file system to client protocol) are achieved, while the security and corruption risks are close to those of file system architectures which force all accesses through the file system server itself.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A system for storage in a storage network, the storage network including a file system server which manages access to storage according to a file system architecture using file system parameters, a plurality of clients of the file system server and one or more storage systems, comprising:
   a plurality of communication interfaces, adapted for connection via communication media to respective ones of the plurality of clients and one or more storage systems; and
   processing resources, coupled with the plurality of communication interfaces, which manage communication via said plurality of communication interfaces according to a storage area network protocol which identifies units of storage according to storage area network parameters, and including logic to identify a particular message received from one of the plurality of clients under the storage area network protocol as a message relating to the file system architecture, to parse the particular message for file system parameters of an access according to the file system architecture, and to translate said file system parameters to an access using storage area network parameters.

2. The system of claim 1, wherein said file system parameters comprise file access block parameters.

3. The system of claim 1, wherein said storage area network protocol comprises a protocol compliant with a Standard Small Computer System Interface SCSI protocol.

4. The system of claim 1, wherein said storage area network protocol comprises a protocol compliant with a standard Fibre Channel Protocol FCP.

5. The system of claim 1, wherein said resources comprise memory and a computer program stored in the memory for mapping logical file identification parameters to physical storage block parameters.

6. The system of claim 1, wherein said particular message comprises a command according to the storage area network protocol directed to a file system virtual volume.

7. The system of claim 1, wherein said particular message comprises a command according to the storage area network protocol directed to physical block outside an actual range of physical blocks accessible in the storage area network.

8. The system of claim 1, wherein said particular message comprises a command compliant with a SCSI write command with at least a portion of said file system access parameters carried in a buffer associated with the command.

9. The system of claim 1, wherein the resources further include logic for logical bounds checking for said particular message.

10. The system of claim 1, wherein the resources further include logic for access control for said particular message.

11. A method for access to storage resources by a plurality of clients in a storage network operating according to a storage area network protocol, comprising:
    providing a file system server in the storage area network, and in communication with the plurality of clients for file access management via a communication network, which manages access to storage according to a file system architecture;
    installing an intermediate system in the storage area network between the plurality of clients and storage resources in the storage area network;
    identifying a particular message received in the intermediate system from one of the plurality of clients under the storage area network protocol as a message relating to the file system;
    parsing the particular message in the intermediate system for file system parameters of an access according to the file system architecture;
    translating said file system parameters to an access using storage area network parameters; and
    routing said access using the storage area network parameters through the intermediate device.

12. The method of claim 11, wherein said file system parameters comprise file access block parameters.

13. The method of claim 11, wherein said storage area network protocol comprises a protocol compliant with a Standard Small Computer System Interface SCSI protocol.

14. The method of claim 11, wherein said storage area network protocol comprises a protocol compliant with a standard Fibre Channel Protocol FCP.

15. The method of claim 11, including mapping logical file identification parameters of said file system parameters of the file system to physical storage block parameters of said storage area network parameters.

16. The method of claim 11, wherein said particular message comprises a command according to the storage area network protocol directed to a file system virtual volume.

17. The method of claim 11, wherein said particular message comprises a command according to the storage area network protocol directed to physical block outside an actual range of physical blocks accessible in the storage area network.

18. The method of claim 11, wherein said particular message comprises a command compliant with a SCSI write command with at least a portion of said file system access parameters carried in a buffer associated with the command.

19. The method of claim 11, including performing logical bounds checking for said particular message in said intermediate system.

20. The method of claim 11, including performing access control for said particular message in said intermediate system.

21. An article of manufacture, comprising a machine readable storage medium, and a computer program stored therein, the computer program for operation in an intermediate device in a storage network, the storage network including a file system server which manages access to storage according to a file system architecture using file system parameters, a plurality of clients of the file system server and one or more storage systems, and comprising:

program instructions which upon execution in the intermediate device manage communication via said plurality of communication interfaces according to a storage area network protocol which identifies units of storage according to storage area network parameters, identifies a particular message received from one of the plurality of clients under the storage area network protocol as a message relating to the file system architecture, parses the particular message for file system parameters of an access according to the file system architecture, and translates said file system parameters to an access using storage area network parameters.

22. The article of claim 21, wherein said file system parameters comprise file access block parameters.

23. The article of claim 21, wherein said storage area network protocol comprises a protocol compliant with a Standard Small Computer System Interface SCSI protocol.

24. The article of claim 21, wherein said storage area network protocol comprises a protocol compliant with a standard Fibre Channel Protocol FCP.

25. The article of claim 21, wherein said instructions map logical file identification parameters to physical storage block parameters.

26. The article of claim 21, wherein said particular message comprises a command according to the storage area network protocol directed to a file system virtual volume.

27. The article of claim 21, wherein said particular message comprises a command according to the storage area network protocol directed to physical block outside an actual range of physical blocks accessible in the storage area network.

28. The article of claim 21, wherein said particular message comprises a command compliant with a SCSI write command with at least a portion of said file system access parameters carried in a buffer associated with the command.

29. The article of claim 21, wherein the instructions perform logical bounds checking for said particular message.

30. The article of claim 21, wherein the instructions perform access control for said particular message.

* * * * *